Dec. 23, 1958     M. C. BOYSEN     2,865,655
LAND VEHICLE WHEEL FLAP
Filed March 26, 1956

INVENTOR.
MARTIN C. BOYSEN
BY

United States Patent Office 2,865,655
Patented Dec. 23, 1958

2,865,655
LAND VEHICLE WHEEL FLAP
Martin C. Boysen, Joseph, Oreg.
Application March 26, 1956, Serial No. 573,858
6 Claims. (Cl. 280—154.5)

This invention relates to a wheel flap designed to intercept material thrown from the rotating wheels of a land vehicle.

Land vehicles such as trucks and trailers usually operate for considerable distances at fairly high speeds upon public highways where the requirements for general highway safety demand that some kind of a wheel shield or wheel flap be provided to stop or intercept material thrown from the revolving wheels. The hazard to following vehicles from such thrown material has been constantly increasing as the truck and trailer speeds increase.

On certain types of vehicles such as log trucks and trailers, it is impractical to provide conventional fenders and mud guards about the wheels. These may not be employed because they become damaged and broken during the functions of loading and unloading logs.

Heretofore wheel flaps or "mudguards," as they are conventionally termed, have been devised which may be quite conveniently applied to and removed from the protective position adjacent to revolving wheels, and it is customary in such structures to provide some sort of resilient locking means. This is to provide a quick acting, manually operated means for securing and releasing the mudguards. It is required that these guards be applied when the vehicle is traveling on public roads, but they may be removed and, in most instances must necessarily be removed, when the logging truck and trailer are being operated over the unimproved private roads such as are found in the mountains where the logs are being cut.

It is therefore evident that a mudguard to be practical must be readily removable and applicable.

Another feature desired in a mudguard has been brought to attention by the fact that the metal framework usually employed to support the flap is very often bent, twisted, and irreparably damaged during the normal operation of the logging truck and trailer. For the purpose of explanation, consider the fact that it is often necessary to traverse a considerable number of miles on unimproved public roadways where for the safety of the driving public in general the mudguards are employed, but the mud and other materials thrown by the revolving wheels has a tendency to collect and plaster on the flaps until they become so heavy as to actuate the resilient securing means which obviously must be sufficiently weak to admit of manual manipulation. This causes the flaps to sag sufficiently so that they will drag upon the roadway. This in itself is not too objectionable, but when it is necessary to back the truck and trailer under this condition, the flaps are caught under the wheels which they are designed to shield, and thus the complete mudguard and mounting mechanism is twisted and distorted, and if repairable at all, considerable expenditure of money and labor results.

The present invention is designed to provide a wheel flap or mudguard which has a connecting means adapted for quick manual application and removal of the mudguards and also adapted to serve as a pressure responsive releasable connector adapted to automatically reset so that when pressures increase on the wheel flap to a degree substantially more than that required to support the wheel flap and any mud that may adhere thereto, it will automatically release the flap without mutilating the connecting means.

The present invention is designed to obviate these stated undesirable features and, in addition, there are also other objects and advantages which will become apparent during a reading of the following specification when considered in conjunction with the accompanying drawing wherein like numerals are employed to designate corresponding parts.

Figure 1:
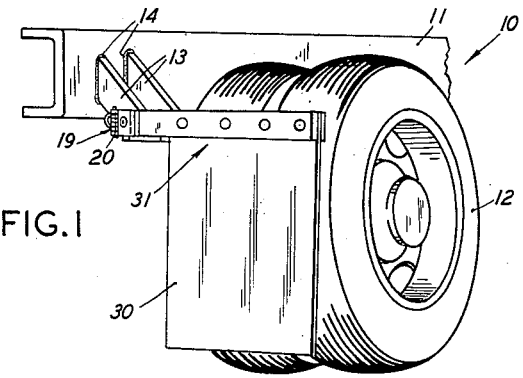
Figure 1 is a fragmentary perspective view of a portion of a truck or trailer having the improved wheel flap or mudguard secured in place.

A land vehicle, such as a truck or trailer, is indicated by the numeral 10 and since its structure is conventional and very well known, only a frame member 11 and the dual driving wheels 12 are disclosed in the drawing. It will be understood, however, that the improved mudguards are intended for use upon a complete land vehicle wherein the wheels 12 are rotatable, and these wheels may be the driven rear wheels of a truck or they may be the wheels of a trailer, as found necessary in the practice of the invention. Obviously, the mudguards may be positioned in front, over or about the wheel without changing the essence of the invention, and such variations in location are contemplated.

Figure 2:
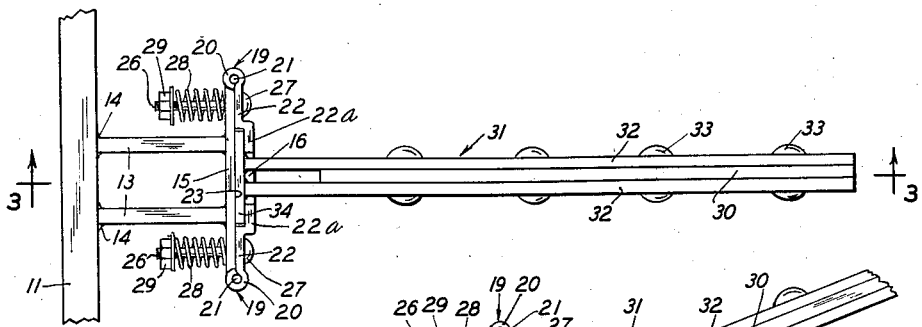
Figure 2 is a horizontal top plan view of the improved mudguard.
Figure 3:
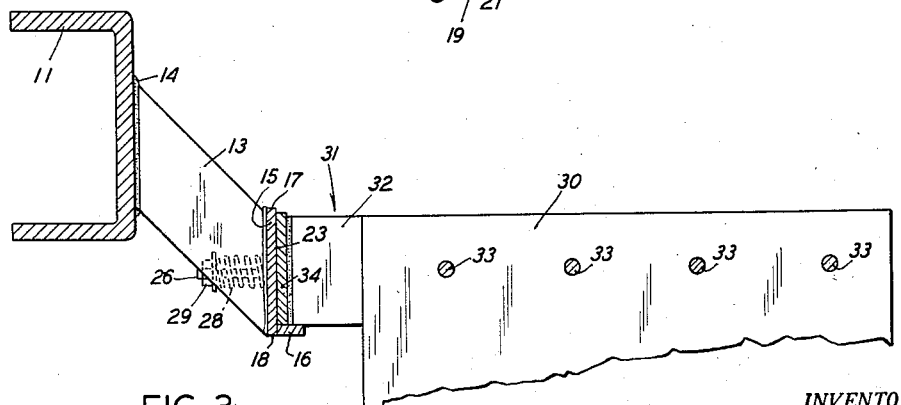
Figure 3 is a view partially in section taken on a vertical plane indicated by the line 3—3 of Figure 2.

In the drawing I have shown brackets 13 which are welded at 14 to the frame member 11, and at their outer ends support a back plate 15. As most conveniently seen in Figure 3 of the drawing, the back plate is provided with a right angle support lip 16 spaced from its upper edge 17 and disposed at its lower edge 18 and extending from its front or outer face 23. At its vertical side edges 19, the back plate is provided with segmented vertical sleeves forming a complementary portion of a hinge 20, through which a conventional hinge pin 21 extends. The other complemental segmental sleeve portions of the hinges 20 are formed on keepers 22 which are disposed in overlying relationship to the outer face 23 of the back plate 15. Apertures 24 and 25 are formed respectively in the keepers 22 and the back plate 15, and in aligned pairs, when the keepers 22 are in face to face engagement with the back plate 15, as seen in Figure 2.

Figure 5:
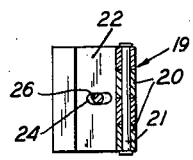
Figure 5 is a fragmentary detail of one keeper as at line 5—5 of Figure 4.
Figure 4:
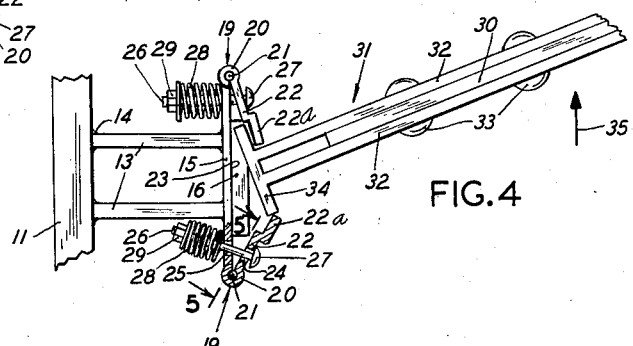
Figure 4 is a view similar to Figure 2 and showing the connector releasing the flap due to pressure thereon.

Bolts 26, having heads 27 enlarged over the size of the apertures 24 and 25, extend through said apertures and tension springs 28 are confined on the bolts by means of conventional nuts 29 on the bolts 26. The tension springs bear against the back plate 15 and exert longitudinal pressure on the bolts 26 and thereby yieldably confine the keepers 22 in face to face relationship to the back plate 15. As seen in Figure 5, the apertures 24 and 25 are elongated in one direction to permit angular positioning of the bolts 26 as shown in Figure 4, so that the flap 30 may be releasably secured thereto.

The flap 30 is supported by an arm 31 which is here shown to consist of a pair of clamping bars 32 which clamp the upper edge of the flap 30 by means of a plurality of rivets 33 extending through the bars and the upper edge of the flap which is disposed therebetween.

At one end of the arm 30, I provide a laterally extending base plate 34 which is welded or otherwise secured rigidly thereto, and this base plate is adapted to fit into the socket defined by the outwardly offset portions 22a which are outwardly spaced from the inner face 23 of the back plate 15 and said inner face 23. Obviously then the socket is open upwardly and the flap may be applied by sliding the base plate 34 downwardly therein and may be manually removed by lifting the flap upwardly and sliding the base plate 34 upwardly out of said socket.

Should the flap 30 become entangled in underbrush or be caught under the wheels 12, the increased pressure on the flap 30 as indicated by the arrow 35 will cause the base plate 34 to apply pressure to the keepers 22 and the springs 28 will permit the keepers to shift and release the base plate therefrom, and subsequent to its release to automatically return to the normal positions wherein they are disposed to receive the base plate 34. It will thus be noted that I have provided a pressure responsive releasable connector having means for resetting or automatically returning to its normal position between the flap and the land vehicle. The flap will remove by increased pressure regardless of which direction the pressure is applied to the arm 31.

Having thus described my invention, I claim as new and desire to secure by Letters Patent of the United States:

1. In combination with a land vehicle having a frame member and a rotatable wheel, a pressure responsive releasable connector for a wheel flap comprising a vertically disposed socket fixed relative to said frame member and having a portion thereof yieldable to increased pressure to open said socket; means for automatically resetting said socket in its normal position; a member shaped to enter and mate with said normally disposed socket and initially confined therein for automatic removal therefrom when said socket is open; and a wheel flap carried by said mating member in position to stop material thrown by said wheel.

2. A vehicle wheel flap and the like, comprising a supporting arm for the flap, a mating member on one end of said arm; a second mating member cooperably associated with said first named member to support said arm; one said mating member being provided with yieldable means responsive to increased pressure only for opening said subject mating member to completely release the other said mating member; and the second said mating member being adapted to be secured to support said mating members, arm and flap.

3. In combination with a land vehicle having a frame member and a rotatable wheel, a releasable connector for a wheel flap comprising a back plate secured to said frame in a substantially vertical plane and having a horizontally disposed support lip spaced downwardly from its upper edge; keepers yieldably secured in overlying relationship to the marginal vertical edge portions of said back plate and disposed above said support lip; said keepers having at least a portion spaced from said back plate and together therewith defining an upwardly open socket; a base plate slidable downwardly into said socket and having portions thereof confined intermediate said back plate and said yieldable keepers; arms carried by said base plate; and a flap secured to said arms and disposed to stop material thrown by rotation of said wheel.

4. The invention as defined in claim 3, wherein said keepers are pivotally connected to said back plate along its vertical side edges and spring means are employed to yieldably hold the keepers in overlying relationship to said back plate.

5. The invention as defined in claim 3 wherein the keepers are hingedly connected to the vertical side edge portions of said back plate; aligned bores extending through each said keeper and the back plate; bolts having heads enlarged over the size of said bores and extending therethrough; and compression springs urging said bolts to yieldably retain said keepers in overlying relationship to said back plate.

6. A vehicle wheel flap and the like, comprising a supporting arm for the flap, a mating member on one end of said arm; a second mating member cooperably associated with said first named member to support said arm; one said mating member being provided with yieldable means responsive to increased pressure only for opening said subject mating member to completely release the other said mating member; means for automatically resetting said last named mating member in its normal position; and the second said mating member being adapted to be secured to support said mating members, arm and flap.

References Cited in the file of this patent

UNITED STATES PATENTS

| | | |
|---|---|---|
| 1,930,376 | Willett | Oct. 10, 1933 |
| 2,352,727 | McMahon | July 4, 1944 |
| 2,559,099 | West | July 3, 1951 |
| 2,652,266 | Miller | Sept. 15, 1953 |

FOREIGN PATENTS

| | | |
|---|---|---|
| 321,968 | Italy | Oct. 23, 1934 |